(12) United States Patent
Chavez et al.

(10) Patent No.: US 10,212,145 B2
(45) Date of Patent: Feb. 19, 2019

(54) METHODS AND SYSTEMS FOR CREATING AND EXCHANGING A DEVICE SPECIFIC BLOCKCHAIN FOR DEVICE AUTHENTICATION

(71) Applicant: Avaya Inc., Santa Clara, CA (US)

(72) Inventors: David Chavez, Broomfield, CO (US); Laurent Philonenko, San Francisco, CA (US)

(73) Assignee: Avaya Inc., Santa Clara, CA (US)

( * ) Notice: Subject to any disclaimer, the term of this patent is extended or adjusted under 35 U.S.C. 154(b) by 66 days.

(21) Appl. No.: 15/284,103

(22) Filed: Oct. 3, 2016

(65) Prior Publication Data

US 2017/0295157 A1 Oct. 12, 2017

Related U.S. Application Data

(60) Provisional application No. 62/319,142, filed on Apr. 6, 2016.

(51) Int. Cl.
*H04M 1/66* (2006.01)
*H04L 29/06* (2006.01)
*H04B 1/3816* (2015.01)
*H04W 12/06* (2009.01)

(52) U.S. Cl.
CPC ........ *H04L 63/08* (2013.01); *H04B 1/3816* (2013.01); *H04L 63/1466* (2013.01); *H04W 12/06* (2013.01)

(58) Field of Classification Search
CPC ... H04L 9/3255; H04L 9/0861; H04L 9/0891; H04L 9/0894; H04L 9/3247; H04L 63/0435; H04L 63/04; G06Q 40/12; G06Q 20/0655; G06Q 20/401; G06Q 20/102;
(Continued)

(56) References Cited

U.S. PATENT DOCUMENTS 9,301,140 B1 3/2016 Costigan et al.
9,344,892 B1 5/2016 Rodrigues et al.
2006/0046689 A1 3/2006 Kim
(Continued)

OTHER PUBLICATIONS

Official Action for U.S. Appl. No. 15/354,816, dated Mar. 14, 2017 6 pages, Restriction Requirement.
(Continued)

*Primary Examiner* — Idowu O Osifade
(74) *Attorney, Agent, or Firm* — Sheridan Ross P.C.

(57) ABSTRACT

Mobile devices and other devices used in transactions or interactions with other computer systems can be identified by an abstract composite of information unique to the device. For example, the device can record and store when a user first started the device (a date and time of first use), how the device is configured (including any hardware/software identifications, versions, install dates, time when configurations or installations occurred, etc.), etc. All of the information can be collected for a specified period of time (e.g., 30 minutes, 1 hour, etc.), periodically, or continually. This process yields a large collection of data, which can be condensed (a record before condensing the data may be approximately 10 to 50 MB). The data may then be encapsulated in a blockchain. At least a portion of the blockchain may then be exchanged to identify the device.

20 Claims, 9 Drawing Sheets

(58) Field of Classification Search
CPC .. G06Q 20/4016; G06Q 20/405; G06Q 50/18;
G06F 8/65; G06F 21/62
See application file for complete search history.

(56) References Cited

U.S. PATENT DOCUMENTS

| | | |
|---|---|---|
| 2007/0028298 A1 | 2/2007 | Snyder et al. |
| 2010/0041424 A1 | 2/2010 | Osborn |
| 2012/0077462 A1 | 3/2012 | Rozensztejn et al. |
| 2012/0167162 A1 | 6/2012 | Raleigh et al. |
| 2012/0198539 A1 | 8/2012 | Liu et al. |
| 2013/0263233 A1 | 10/2013 | Dinha |
| 2014/0286484 A1 | 9/2014 | Ehrlich et al. |
| 2014/0379340 A1 | 12/2014 | Timem et al. |
| 2015/0332283 A1 | 11/2015 | Witchey |
| 2016/0065588 A1 | 3/2016 | Wheeler |
| 2016/0294783 A1* | 10/2016 | Piqueras Jover ... H04L 63/0442 |
| 2017/0046792 A1* | 2/2017 | Haldenby .......... G06Q 20/0655 |
| 2017/0048707 A1 | 2/2017 | Ortiz et al. |

OTHER PUBLICATIONS

Official Action for U.S. Appl. No. 15/354,816, dated Jul. 12, 2017 13 pages.
Official Action for United Kingdom Patent Application No. GB1705579.9, dated Sep. 29, 2017 8 pages.
Official Action for U.S. Appl. No. 15/354,816, dated Dec. 11, 2017 16 pages.
Official Action for U.S. Appl. No. 15/354,816, dated Apr. 24, 2018 14 pages.

* cited by examiner

US 10,212,145 B2

METHODS AND SYSTEMS FOR CREATING AND EXCHANGING A DEVICE SPECIFIC BLOCKCHAIN FOR DEVICE AUTHENTICATION

CROSS REFERENCE TO RELATED APPLICATIONS

The present application claims the benefits of and priority, under 35 U.S.C. § 119(e), to U.S. Provisional Application No. 62/319,142, entitled "BLOCKCHAIN SECURITY SOLUTIONS," filed Apr. 6, 2016, which application is incorporated by reference, in its entirety, for all that it teaches and for all purposes.

SUMMARY

In accordance with embodiments of the present disclosure, systems and methods are presented for providing security in interactions between devices. Generally, to ensure that interactions are not being spoofed, a server or computing system on a network needs to identify a device, such as a smartphone, computer, or browser therein, that is interacting with it. Further, the server may need to identify the user in operation of the device. Generally, the identities are determined by exchanging confidential information, for example, a username and password.

How the device will be identified is redefined by the embodiments presented herein. The device can be identified by an abstract composite of information, for example, when a user started the device the first time, how the device is configured (including the minute steps and the timing for installing or configuring applications), what applications, services, etc. the user has downloaded and when, what access points/MAC addresses were detected on startup, etc. All of the information will be collected for a specified period of time (e.g., 30 minutes, 1 hour, etc.). This process yields a large collection of data that may then be distilled or condensed. A record may be approximately 10 to 50 MB. With that much information available for analysis, establishing the identity of the device could be a million times more secure than any existing method. The data can then be encapsulated in a blockchain.

BRIEF DESCRIPTION OF THE DRAWINGS

The present disclosure is described in conjunction with the appended Figures.

Figure 1:
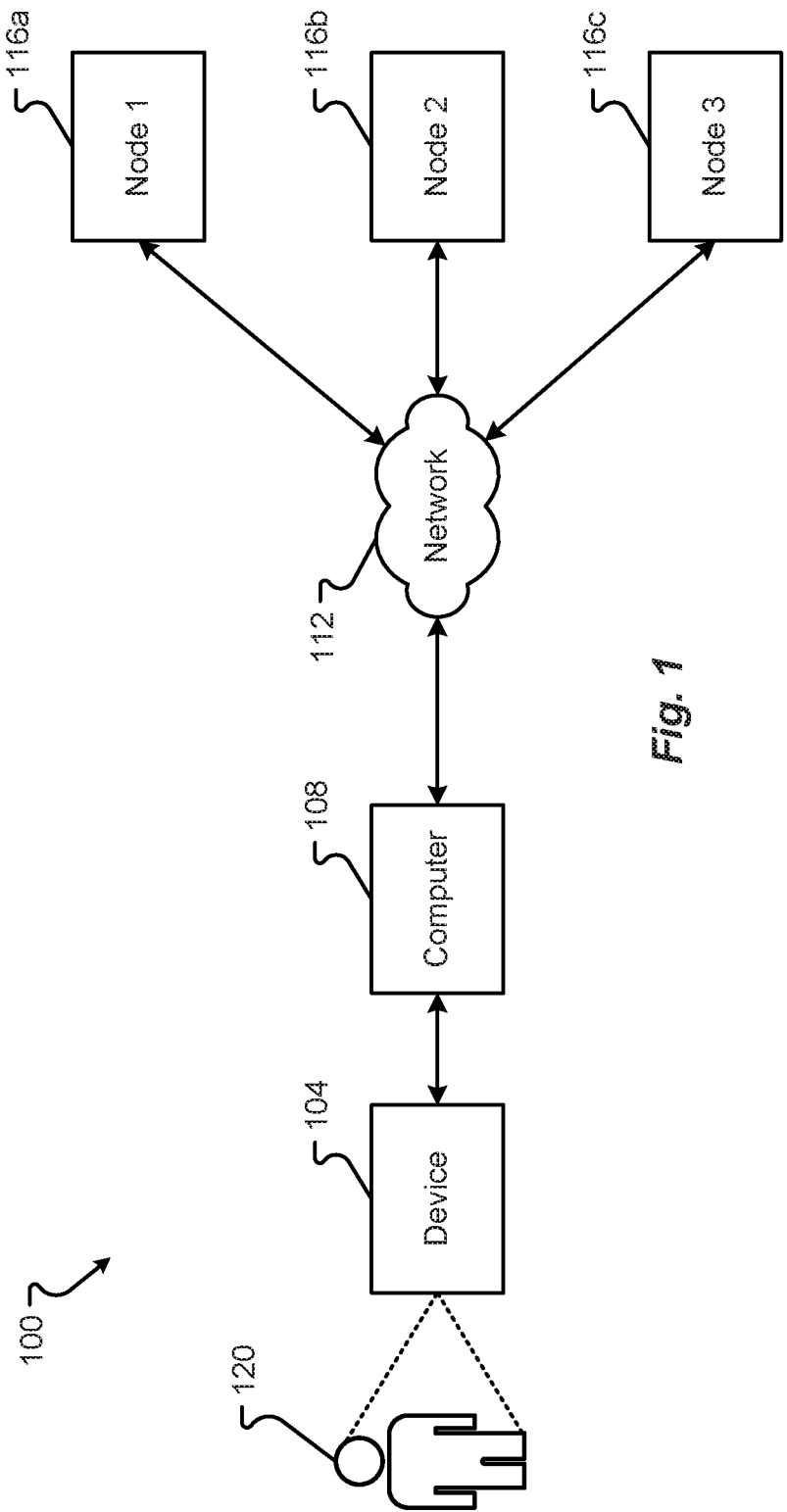
FIG. 1 depicts an embodiment of an environment for conducting interactions between devices and servers.

In the appended Figs., similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Smartphone identity today is generally associated with a Subscriber Identity or Identification Module (SIM) in the device. If you change devices, you can take your information with you. The drawback to the SIM is that the SIM is trying to approximate "you" as the user of the device. This situation is not ideal. When doing secure interactions, it is desirable to have an idea about the device itself as something that the user operates. So the user (you) should be separated from the device that you have (smartphone).

If you get away from the SIM, another way to determine identity of a smartphone is with an International Mobile Station Equipment Identity (IMEI). The IMEI is a 15-digit long integer that identifies a device from a mobile carrier's perspective. It should be unique, but it is an integer of a fixed length. A carrier can use the IMEI to identify a device. To identify a device, a network typically uses a media access control (MAC) address associated with a Wi-Fi port, an integrated circuit card identifier, or a Uniform Code Council (UCC) ID—all of which are associated with a device. All of these are short-length fixed strings meant to be unique keys to identify the device. Because the unique keys are limited in length, the unique keys can be spoofed.

Carriers and networks try to avoid fraud by requiring a highly secure certificate exchange. The certificate exchange can work both ways between the carrier's network and the device. The certificate secures the interaction, but an identity is still necessary. The above strings are still used to determine identity.

In the embodiments presented herein, how the device (and the user) is identified is redefined. The device can be identified by an abstract composite of information unique to the device. For example, the device can record and store when a user first started the device (a date and time of first use), how the device is configured (including any hardware/software identifications, versions, install dates, time when configurations or installations occurred, etc.), what applications the user has downloaded, what access points/MAC addresses were detected on startup or have been contacted and when, etc. All of the information can be collected for a specified period of time (e.g., 30 minutes, 1 hour, etc.), periodically, or continually. This process yields a large collection of data, which can be condensed (a record before condensing the data may be approximately 10 to 50 MB). The data may then be encapsulated in a blockchain.

A blockchain is a distributed database that maintains a continuously growing list of data records that each refer to previous item on the list and is thus hardened against tampering and revision. The blockchain proposed herein can be stored and maintained with the mobile carrier for the device. The blockchain may include the startup information described previously and the authentication data that was shared, for some period of time, between the device and the network. After the initial period of time, the authentication data may be changed less frequently (e.g., monthly, bi-monthly, etc.).

The blockchain can continue to grow, and, to keep such a large amount of data, the carrier's Home Subscriber Server (HSS) may be employed. Additionally, or alternatively, the blockchain may be stored in a supplementary store. The blockchain can identify the device uniquely and cannot be replicated by anyone else. It is impossible to replicate the timing of events, even if a would-be spoofer were in the same location. Initialization of a device can also include the inclusion of soft data (e.g., songs, persona on social media, etc.). It is practically impossible to replicate all of the elements in the same location with the same timing with exactly the same level of detail. Even if this were attempted on another device, the registration intervals will look completely different to the mobile carrier. Further, the appending of the blockchain with registration information and including the startup information can block and/or preclude replication. The blockchain method gives a forgery-proof and fraud-proof identity for the device which is an important basis for the embodiments described herein.

The blockchain may require a massive amount of data storage, but with the availability of cloud storage and massive data stores, the size of the blockchain is not problematic. The blockchain can be stored in multiple locations, referred to as a node. As such, replicating the blockchain becomes impossible as the embodiments can include a voting mechanism if something appears to be different from the other nodes. Unless all nodes can be infected/changed simultaneously across all instances of the blockchain, the identity of the device cannot be changed.

A person's identity can be determined by biometrics (e.g., known techniques for facial recognition, fingerprint analysis, voice recognition, etc.). The user can take a picture of themselves, read a given phrase and the user will volunteer a phrase, etc. The combination of the various information, can form a biometric profile which can be used to create a user's identity key.

The user's identity key can be included in and surrounded by a blockchain. The user identity blockchain may be store on device or in a cloud node (i.e., one or more servers available over a network, such as the Internet). The blockchain solution described herein can include a plurality of nodes. The user's identity blockchain can be replicated across all nodes that are in operation, which prevents another party from spoofing the information. Further, any one node cannot prevent sharing of the data or prevent movement of the data between nodes. Any third party can operate a node to maintain the blockchain information. For example, banks and insurance companies may maintain a node to keep customer information.

The pairing of the secure device identity with the user identity can occur in an identity node (similar to pairing a device to a service provider's account). From the account perspective, the most important information in the identity is payment information associated with the user. The user's payment account(s) can include a credit card or bank account number to connect the device to the user's finances. This information can be supplied when a secure binding between the device and the carrier is in place. A binding is an indication that the user has been identified by the device and is using the device currently. This fraud-proof binding between the user and the device, based on the user's identity information, can be formed with software in the device. The software can reside in the operating system (OS) or as an application library. The software can interact with the user to do the binding and can notify a node and the service provider whenever the binding is no longer in place.

In an example, the user accesses a smartphone (e.g., an iPhone) with their thumbprint and the device identifies the user. The binding may then be activated by the software and remain active until the user stops using the device. Further, the software module may know how the user typically interacts with the device (e.g., the user is either right or left handed, uses two thumbs to type, uses all of his/her fingers, or uses only the fingers on one hand, what is the user's cadence between keystrokes, does the speed change depending on what letters are being selected, at what angle the user typically holds the device, how long does the user put the device down, etc.). This heuristic information can be monitored to determine if there is a change in behavior or the heuristics are different from an established historical norm. If there is a change or a difference, the binding is broken. Thus, the device should be bound most of the time and, if there is an unbind determination and message, a node or other party cannot assume interactions are secure and with the expected user. Notification will happen when the device is unbound.

Blockchains can also include sidechains, which are separate blockchains that "piggyback" or refer to another blockchain. Sidechains may be blockchains that are interoperable with each other for validation of data and may involve transactions. Businesses that interact with the user can maintain a sidechain associated with a tuple of the user identity blockchain and the device identity blockchain. The sidechain can further concatenate more information onto the sidechain. For example, the sidechain can include information on types of interactions with the user, including getting information (e.g., What's my balance? What were my last 100 transactions? etc.), doing something (e.g., Move $1000 from checking to savings, Pay my kid's college tuition payment, etc.), placing an order, getting a message back (e.g., Your order has been received and is being processed), receiving an order, registered a product, etc. A variety of sidechains may be associated with different styles of interactions, including getting information, giving instruction, facilitating an exchange, updating information, etc.

An example of using the blockchain may involve banking interactions. In the example, a user may desire to obtain their checking account balance. The first step is to secure the user whose identity will be asserted by initiating and doing the interaction from the device. If the device believes that binding is active, the transaction will be simple, almost effortless. Additionally, the interaction can be conducted from a computer that is required to be in proximity and accessed biometrically. An application can be opened or a proximity exchange can be done between the device and the computer (e.g., NFC, Bluetooth, etc.). A token can be securely passed from the device to the computer or from the computer to the device to secure the connection.

From the application, a dynamically-generated number (8-10 digits) may be sent to a node that is associated with the user's blockchain, used by the far end (third party) to verify the number has been given specifically to the user from the device. This number can be a tuple, which substitutes for a login on the web or for the login overall. The bank uses a handle for the user that includes an association with a portion of the user's identity to authenticate interactions with the associated device with a particular identity. It has been reported to the node that the binding is active and the active binding is published to the other nodes. Anything that can be expressed as a sidechain can be absolutely secure.

The solution is meant to secure interactions for the user bound to the device for specific third-party facilitated interactions. An additional embodiment may include some form of aggregation by a user as a trusted group of devices based on linked blockchains. The embodiments herein provide for the binding of two blockchains together to determine a tuple that is used to secure identity and transactions simultaneously.

An embodiment of an environment 100 for conducting the processes described herein is as shown in FIG. 1. The environment 100 can include one or more devices 104 and/or other computers 108, connected by a network 112, to one or more nodes 116. The device 104 and computer 108 may be in direct connection either through a wireless link or physical interconnection. The device 104, computer 108, and/or nodes 116 may be servers, computer devices, mobile phones, etc. as may be described in conjunction with FIGS. 8 and 9.

Figure 8:
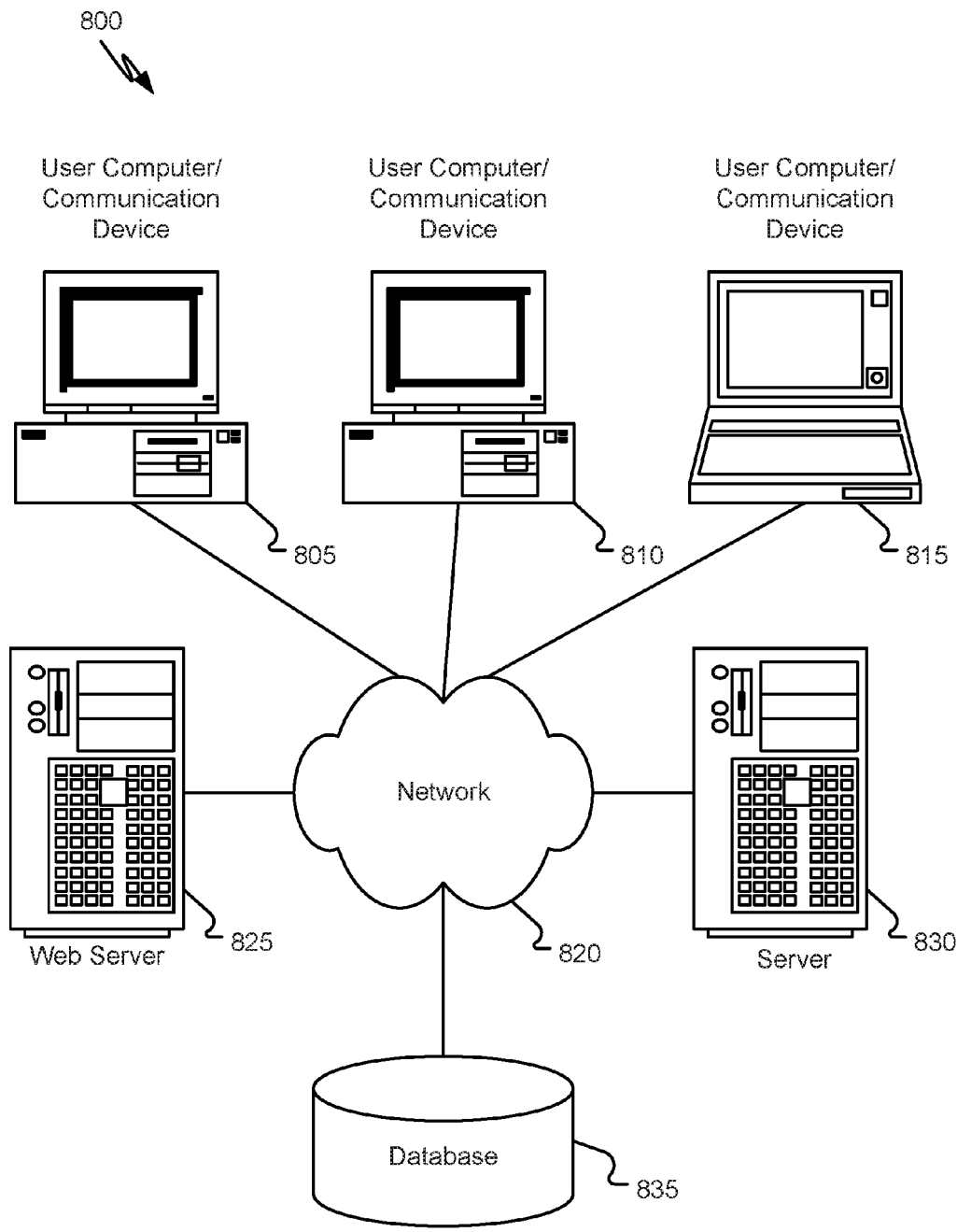
FIG. 8 is a block diagram of a computing environment associated with the embodiments presented herein.
Figure 9:
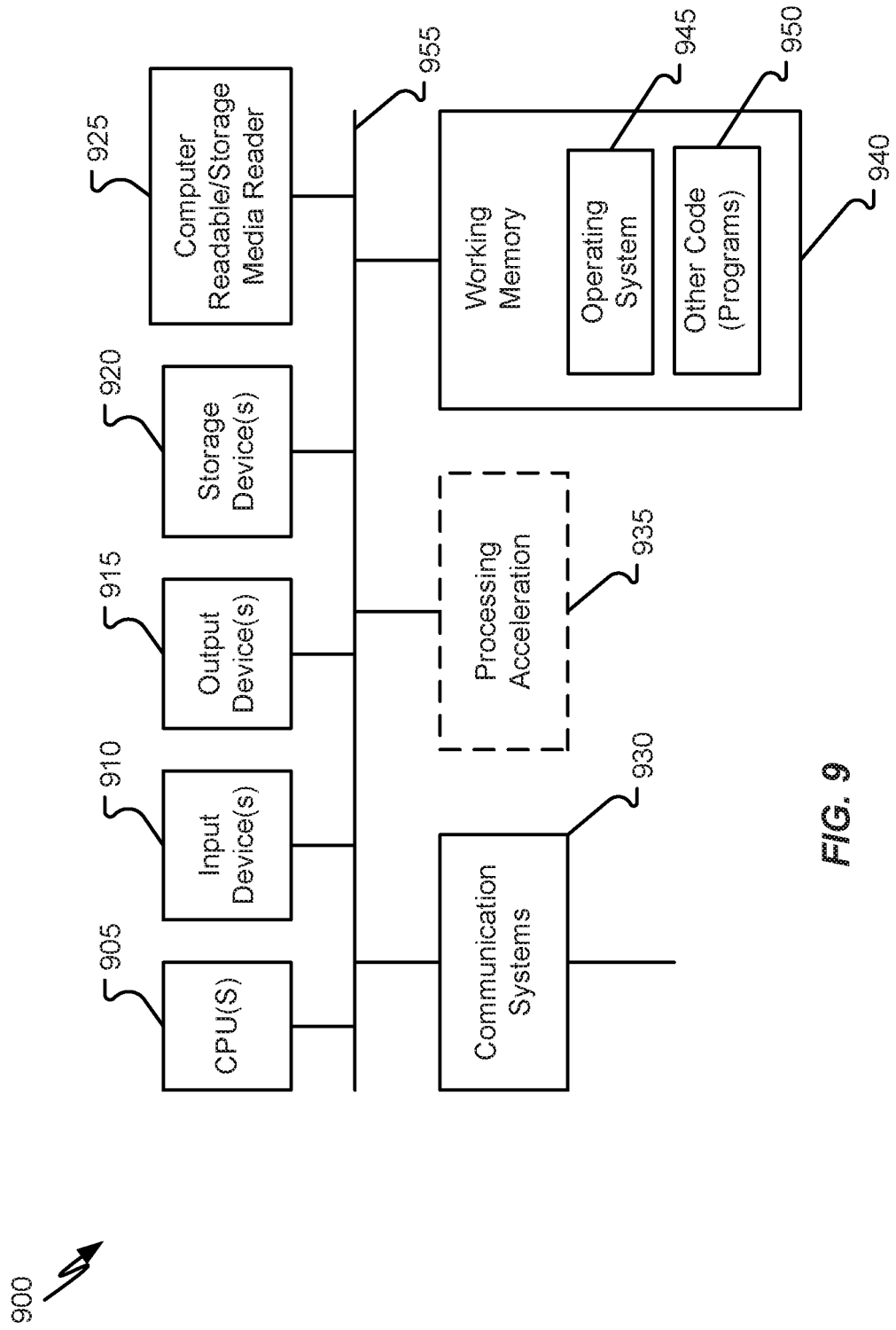
FIG. 9 is a block diagram of a computing device associated with one or more components described herein.

The network 112 may be any type of network, including a local area network (LAN), wide-area network (WAN), wireless LAN, wireless WAN, etc. as described in conjunction with FIGS. 8 and 9. The device 104, computer 108, and nodes 116 are operable to exchange security information, such as blockchain information, which will be described hereinafter, through the network 112. The device 104 may also be able to obtain biometric or other characteristic data of a person 120. This information can be used to form blockchains used in secure transactions or operations.

Figure 2:
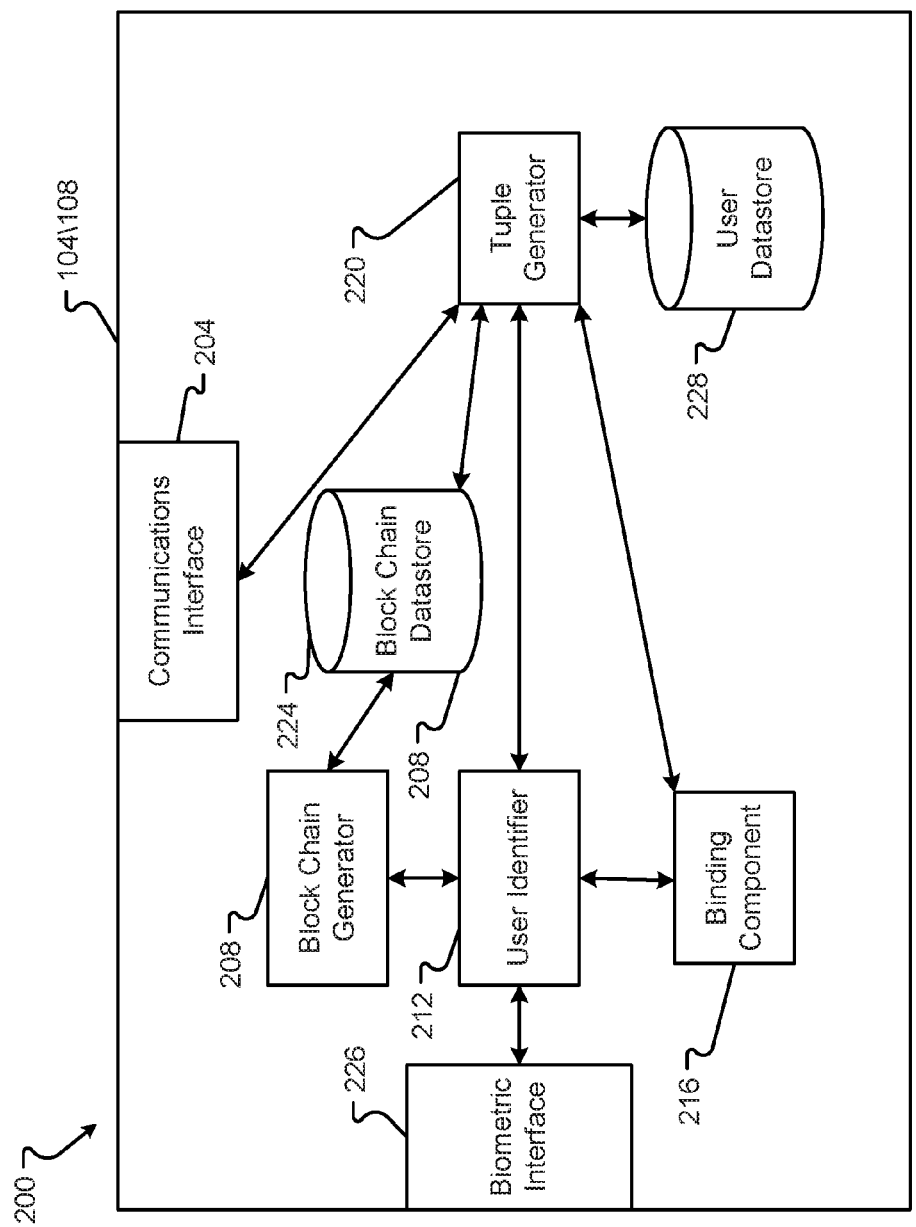
FIG. 2 is a block diagram of an embodiment of a device.

Embodiments of hardware/software 200 that may be associated with the device 104 and/or computer 108 may be as shown in FIG. 2. The components herein can be any type of hardware component or device as described in conjunction, with FIGS. 8 and 9, or may be a combination of hardware and/or software or other resources. These components can include one or more of, but are not limited to, a communications interface 204, a blockchain generator/authenticator 208, a user identifier (ID) component 212, a binding component 216, a tuple generator 220, a blockchain/sidechain data store 224, a user-information data store 228, one or more biometric interfaces 226. Each of these components may be described hereinafter.

The communication interface 204 can be any type of electrical port or wireless antenna that may be able to send or receive data. The communication interface 204 may also include any type of software or hardware that manages, manipulates, or changes the form of the data to provide to the various components shown in FIG. 2.

The blockchain and/or sidechains generator authenticator 208 is a hardware and/or software component that can generate blockchains. A blockchain may be a specific type of data structure; as described in conjunction with FIGS. 4A and 4B. The blockchain can include information about the device 104 and/or computer 108, or may be information about the user 120. The blockchain generator/authenticator 208 can store, update, retrieve, or manage the blockchains in the blockchain/sidechain data store 224. Blockchains are ever-growing information and thus may be updated periodically or as events occur that are associated with one or more blockchains. The blockchain generator/authenticator 208 may also determine whether a blockchain is correct, based on information received through the communication interface 204. Further, the blockchain generator authenticator 208 may send blockchain or retrieve blockchains from the data store 224 for communication through the communication interface 204 to a node 116 or a computer 108.

A user-ID component 212 may to communicate with the biometric interface 226 to obtain information associated with the user. This user information can be a password, can be an ID or identifier, can be biometric data, such as, a fingerprint, an iris-scan, facial recognition, voice recognition, or other types of biometric information. Further, the user-ID component 212 can obtain and evaluate heuristic information such as how the user is interacting with the device 104 and/or computer 108. For example, the user-ID component 212 can record and evaluate keystrokes, rhythm of keystrokes, etc. that identify how a user effectively works with a device 104 and/or computer 108. This information may be sent to the blockchain generator 208 to generate a blockchain associated with the user 120. Further, this information may be sent to a binding component 216 to establish a binding.

The binding component 216 can create a binding between the user 120 and the device 104 and/or computer 108. A binding is a period where the user-ID component 212 has determined the identity of the user 120. While the user is using the device 104/computer 108, the user 120 and device 104 and/or computer are bound by a binding created by the binding component 216. This binding lock or binding signal may be sent through the communications interface 204 to a node 116 or other device, such as the computer 108, for indicating which user 120 is using the device 104 and/or computer 108, and that any information sent about or for the user 120 is associated with the user 120 currently using the device 104 and/or computer 108.

The binding may be based on information stored in the user data store 228. The user data store 228 can be information recorded by the user-ID component 212 and stored therein. This information is associated with the user and is stored in a secure location to prevent unauthorized use. Thus, any information about the user may be used by the binding component 216 to create the binding sent through the communication interface 204.

The blockchain/sidechain data store 224 can be any type of data store; such as a database, a relational database, a file system, etc. This information may be stored or used to store blockchains, as described in conjunction with FIGS. 4A and 4B. This information may be accessible by the blockchain generator/authenticator 208 for authentication of blockchains or for retrieval and transmission of the blockchains to a node 116 or other device.

The tuple generator 220 is a hardware and/or software component operable to generate tuples for one or more blockchains and/or sidechains. Thus, the tuple generator 220 may obtain information from the blockchain and/or sidechain database 224 to create the tuple. A tuple is, as known in the art, a data structure composed of an ordered set of data from different sources. The tuple may be as described in conjunction with FIG. 4C.

Figure 3:
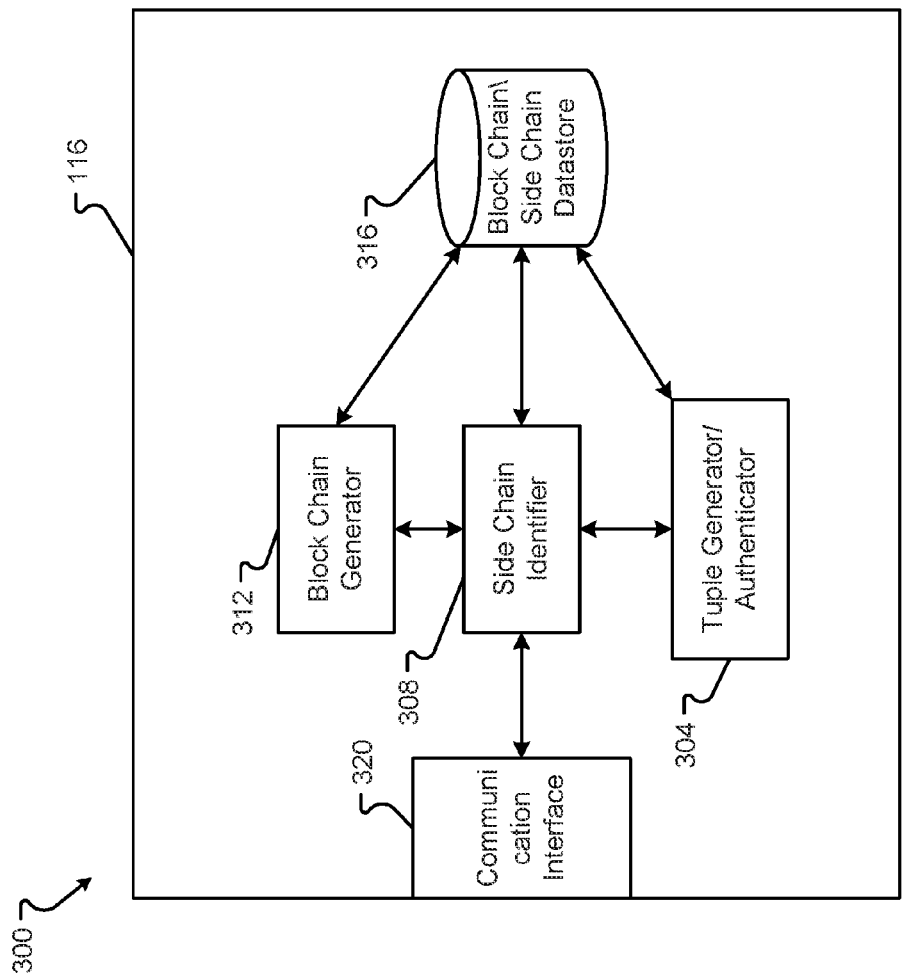
FIG. 3 is a block diagram of an embodiment of a server/node.

A device 300, which may represent the nodes 116, may be as shown in FIG. 3. The node 116 can be a server as described in conjunction with FIGS. 8 and 9, and may include further hardware and/or software as described in conjunction with FIG. 3. Here the node 116 can include one or more of, but is not limited to, a tuple generator/authenticator 304, a sidechain generator 308, a blockchain generator/authenticator 312, a communications interface 320, and a blockchain/sidechain data store 316. The tuple generator/authenticator 304 can be the same or similar to the tuple generator 220, as described in conjunction with FIG. 2. However, the tuple generator/authenticator 304 may also authenticate tuples received from the device 104/computer 108. The communications interface 320 may receive the tuple from the device 104 or computer 108, and that ordered information may then be checked against a blockchain/ sidechain which may be stored in blockchain/sidechain data store 316. This check verifies or compares the ordered data, as described in conjunction with FIG. 4C, with one or more pieces of data within the blockchains or sidechains, as described in conjunction with FIGS. 4A and 4B. If the comparison is correct, the tuple may be verified and a secure transaction may begin.

Figure 4:
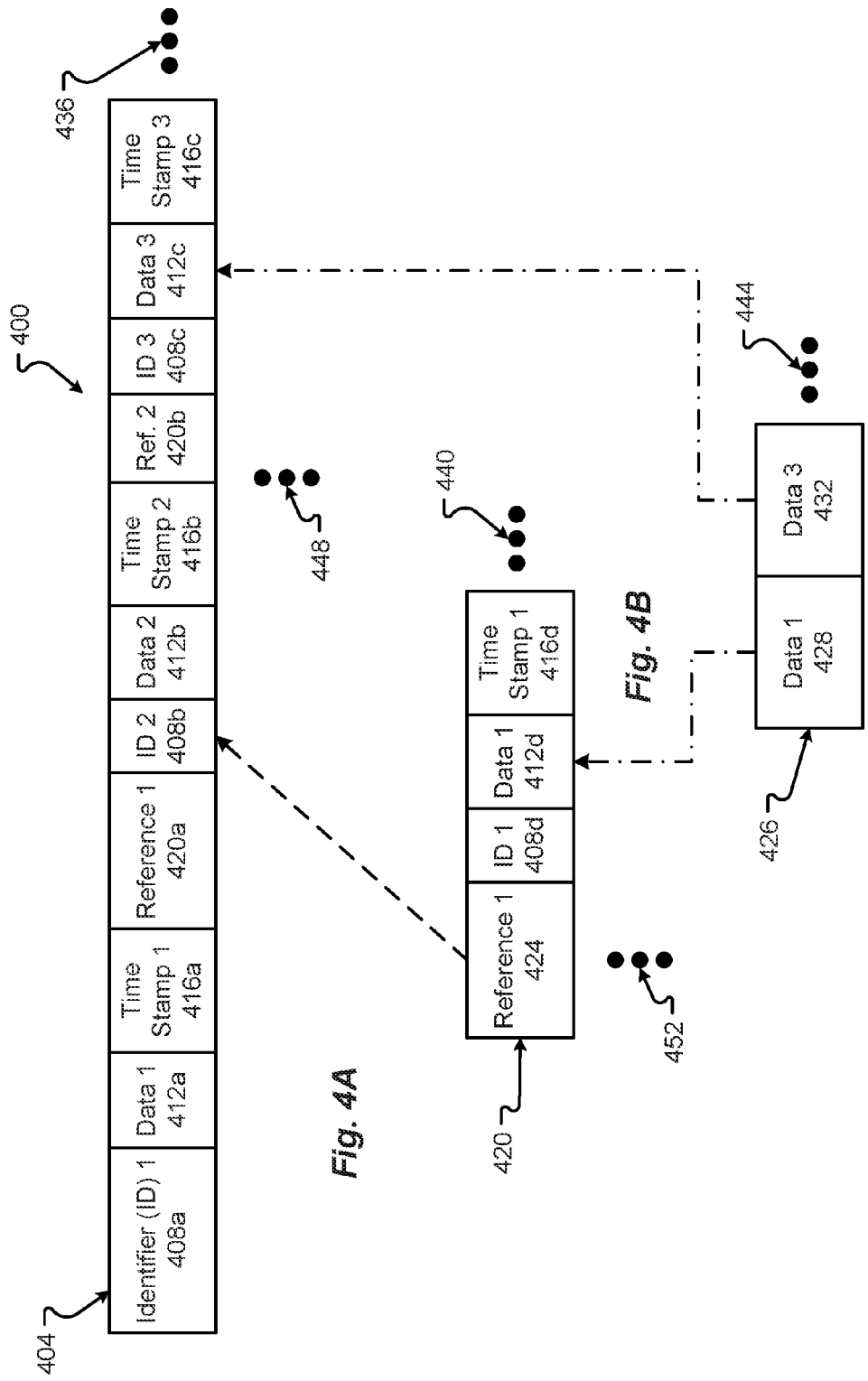
FIG. 4A is a diagram depicting embodiments of data that describe the identity information in a rudimentary blockchain.
FIG. 4B is a diagram depicting embodiments of data that describe a sidechain.
FIG. 4C is a diagram depicting embodiments of a tuple generated from blockchain and/or sidechain data.

The sidechain generator 308 may be the same or similar in function to the blockchain generator 208 but creates sidechains, as described in conjunction with FIG. 4B. Sidechains 308 may cover different associations between the device 104/computer 108, or user 120 and the node 116. The sidechains may be stored in the data store 316. An example of a sidechain may be as described in conjunction with FIG. 4B.

The blockchain/generator/authenticator 312 may be the same or similar to blockchain generator 208, as described in conjunction with FIG. 2. This blockchain/generator authenticator 312 may access the data store 316 to either store new blockchains or to authenticate blockchains stored previously. The components 304, 308, and 312 communicate through a communications interface 320. The communications interface may be the same or similar to communications interface 204 and may have the same or similar protocols, hardware, or software to both send and receive signals back and forth from the device 104 and/or computer 108. The blockchain/sidechain data store 316 may be similar to the blockchain/sidechain data store 224. However, the blockchain/sidechain data store 316 may store different sidechains, blockchains compared to those stored in data store 224. This data store 316 may be the same or similar to devices or systems described in conjunction with FIGS. 8 and 9.

Embodiments of different types of data 400 may be as described in conjunction with FIGS. 4A, 4B, and 4C. This data 400 may be sent, received, or stored in one or more of the data stores: 224, 228, 316 and/or may be generated by various components described previously, and may be received by the other components as described herein previously. FIG. 4A represents a blockchain 400. There may be more than one blockchain in any data store; however, there is a single blockchain 404 shown in FIG. 4A. The blockchain data store 404 can include various different blockchains with various different data as represented by ellipses 448. The blockchain 404 can include more or fewer fields than those shown in FIG. 4A, as represented by ellipses 436. A blockchain 404 is generated from sets of events that have metadata recorded about them. For example, the blockchain 404 is created by at least three sets of events. Each event may include one or more of, but is not limited to, an identifier 408, data 412, and a timestamp 416. Further, blocks within the blockchain 404 that are recorded later than the first blockchain may also include a reference 420. Each of these different fields will be described hereinafter.

The identifier (ID) 408 may identify that particular event. Thus, the ID 408 can be any type of globally unique identifier (GUID), alphanumeric identifier, etc. The identifier 408 is unique to the particular block within the blockchain 404. This ID 408 may increment or may be created separately each time a new block is added to the blockchain 404.

Data 412 includes data about the event. For example, in this particular application, a blockchain data item 412 can include information about the device 104 or computer 108 that is specific to that device or computer 104, 108. For example, the data 412 can include what applications currently reside on the device, what versions those applications are, may include types of interactions between the device or computer 104, 108, and the user 120, may include different communications from or to the device 104 or computer 108, or other events that occurred with either the device 104 or computer 108. This data 412 may be stored as either encrypted or unencrypted data. The data 412 is also associated with a timestamp 416.

The timestamp 416 records the date and/or time which the event occurred. As such, between the data and timestamp 412, 416, several items of information or characteristics of the device 104 or computer 108 are recorded. As such, this information presents a profile that is unmistakable and unduplicatable for both the device 104 and computer 108. As the number of events grow, the blockchain 404 grows.

As a new block is added, a new field is added to the new block. This new field, the reference 420, is a reference back to the block immediately preceding the new data in the blockchain. For example, reference 1 420a refers back to ID 1 408A. Reference 2 420b refers back to ID 2 408b. As such, as the blocks are built, the blocks are chained together by references 420 to the previous block ID 408. Each block includes its own identifier 408, data 412, and timestamp 416. The blockchain 404 grows as each block is added with a new reference 420 to the previous block. Any of the data within the blockchain 404 may be used in a tuple as described in conjunction with FIG. 4C.

Other examples of data that may be stored in blockchains 404 can also include biometrical data about the user 120. For example, voice recognition, fingerprint, iris-scan, other biometric data may be stored as blocks within another blockchain. This data may be used to identify the user used in further tuples described in FIG. 4C.

A sidechain 420 may be as described in conjunction with FIG. 4B. A sidechain 420 may include its own blocks with an ID 408d, data 412d, and timestamp 416d; however, a sidechain 420 may include a reference 424 that is out of sequence in the blockchain 404. For example, reference 1 424 refers to identifier 2 408b. Thus, the block with reference 2 420b and the block in the sidechain 420 with reference 1 424 both refer to ID 2 408d. As such, the second blockchain created with this first reference is considered a sidechain. The sidechain 420 can have more fields than that shown in FIG. 4B, as represented by ellipses 440. The sidechain 420 can grow then by adding its own different chain of blocks to be used in secure transaction identification.

A tuple 426 may be as shown in conjunction with FIG. 4C. A tuple is an ordered set of data extracted from the blockchains 404 or sidechains 420. Thus, there may be a predetermined method for establishing the tuple 426 which is predetermined and provides for which blocks of data are to be extracted to be put into a tuple 426. For example, the tuple 426 shown in FIG. 4C may include a first block or data element 412d in data spot 428. The second data spot 432 may be data from data element 412c. These different extractions of data may be identified in the tuple 426, to alert the recipient of the origin of the data, or may be known between the parties sending and/or receiving the tuple 426. The tuple 426 may include more or fewer data elements than that shown in FIG. 4C, as represented by ellipses 444.

The tuple 426, thus, is a smaller condensed extraction of data from various blockchains 404 and/or sidechains 420 that may be used together to authenticate or verify the identity of the device 104, computer 108, or user 120. Further, the tuple 426 can include combined information about the user 120, the device 104 and/or the computer 108. Thus, the tuple 426 allows for identifying users and devices together, and ensuring an identity for use in secure transactions. This tuple 426 may be verified by nodes 116, the computer 108, device 104, or other entities involved in the interaction. Further, a tuple 426 can be sent to a third party and then forwarded onto a node 116 for authentication or verification.

Figure 5:
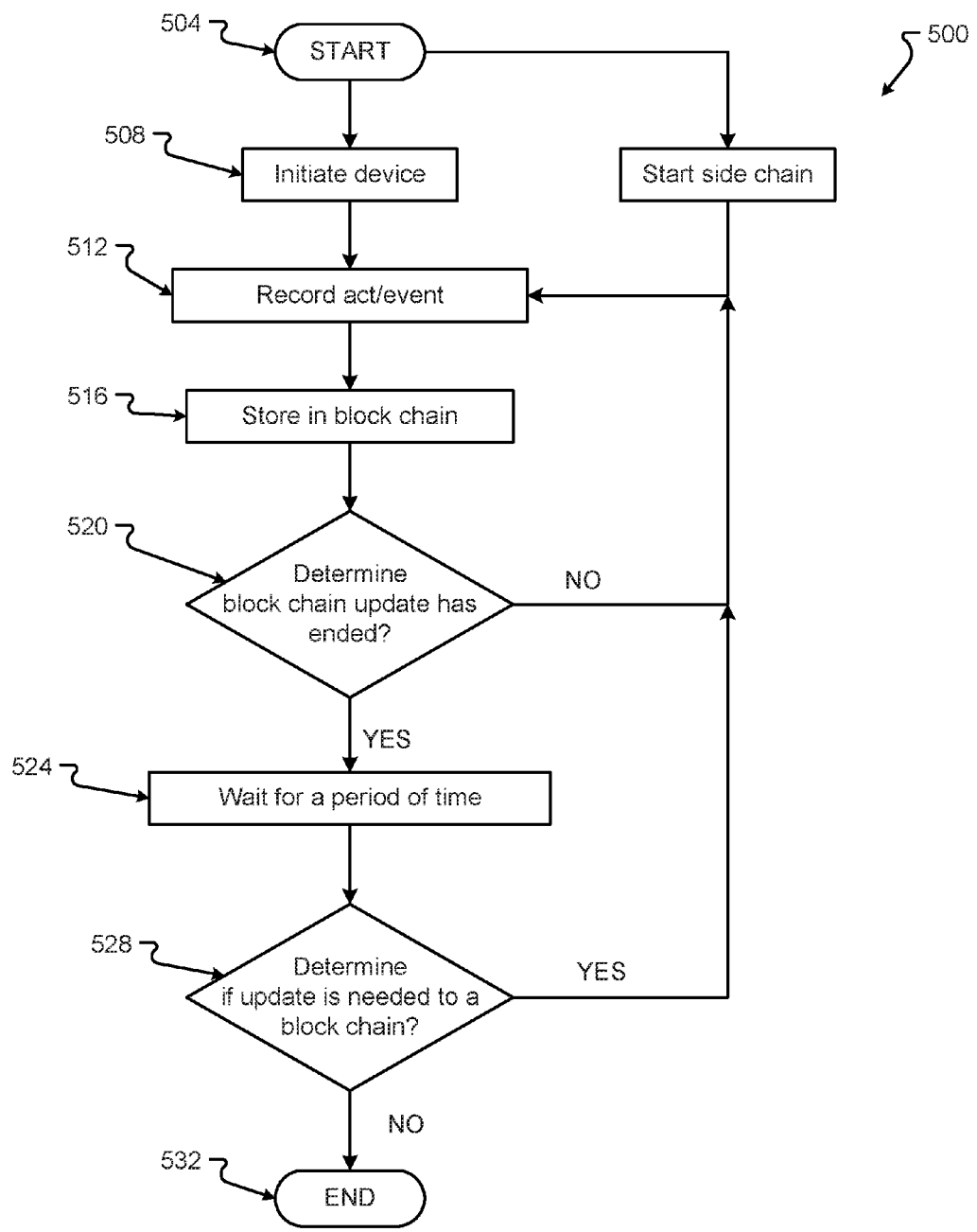
FIG. 5 is a flow diagram of an embodiment of a method generally directed to generating a blockchain including identity information.

An embodiment of a method 500 for generating a blockchain may be as shown in FIG. 5.

The device 104 is initiated, in step 508. The device 104 may be a new device to the user 120 and is initiated, in step 508. Device initiation may include turning on the device for the first time or installing some type of software for the first time. Upon device initiation, the method proceeds to step 516.

If a sidechain 420 is being created, such as that described in FIG. 4B, the method 500 will start by starting a sidechain 420, in step 512. The sidechain 420 may be created by node 116 or computer 108. The sidechain 420 creation process moves from the step 512 to the step 516.

In step 516, the device 104 or computer 108 may record an act or event as a block in the blockchain(s) 404 or 420. The act or event can be any type of event associated with the device 104, some type of event dealing with the user 120, or a transaction with a node 116. For example, if the event is device initiation, the device 104 may record the first time the device 104 was activated, may record the operating system (OS) type or ID, the version, and when the OS was first executed, may record one or more applications on the device 104 and when they were first executed or first installed. If the blockchain 404 is in regard to person 120, the blockchain act can be the act of first identifying the user by a password and logon and/or the time that user first logged on, can be the creation of a biometric parameter, such as, facial recognition, voice recognition, fingerprint, DNA, iris-scan, etc. This biometric information may be associated with a timestamp 416 of when that data was recorded or updated.

If it is a transaction or some other sidechain 420 event, the node 116 may record the type of action or request and the time that the event was associated with the use (e.g., when a user requests access to an account, a withdrawal, or deposit and the time the withdrawal or deposit occurred, etc.). These events or acts and their information are then stored in a blockchain in step 520. Thus, the events or acts are stored within a blockchain 404, as described in conjunction with FIG. 4A. If the information is in regard to a sidechain 420, that information is stored in the sidechain 420, as described in conjunction with FIG. 4B. If it is a first action in the blockchain 404, there is no reference 420. However, if the event is a subsequent action or event recorded in the blockchain 404, after the first event, a reference 420 is created that refers to the block preceding the one being recorded. Each of the different blocks may be recorded sequentially and stored in the blockchain 404 and the stored in a blockchain data store 224, 316.

The device 104, node 116, or computer 108 may then determine if the process 500 is over and there's no more information to store in the blockchain 404 and/or 420. If more blocks are to be stored in blockchain 404 and/or 420, the process 500 proceeds NO to record another act or event, in step 516. However, if there is no more information to record, the process 500 proceeds YES to step 528, where the device 104, computer 108, or node 116 will wait for a period of time. This period of time may be minutes, days, hours, weeks, etc. The period of time allows for the blockchain 404 or sidechain 420 to be updated periodically. Thus, the period of time to wait can be predetermined, user-established, or may be random. After the period of time, the device 104, computer 108, or node 116 may determine if an update to the blockchain 404 or sidechain 420 is necessary, in step 532. If an update is necessary, the method 500 proceeds YES back to event 516 to record the event or act. If no update is necessary, the method 500 may proceed NO to end process 536.

Figure 6:
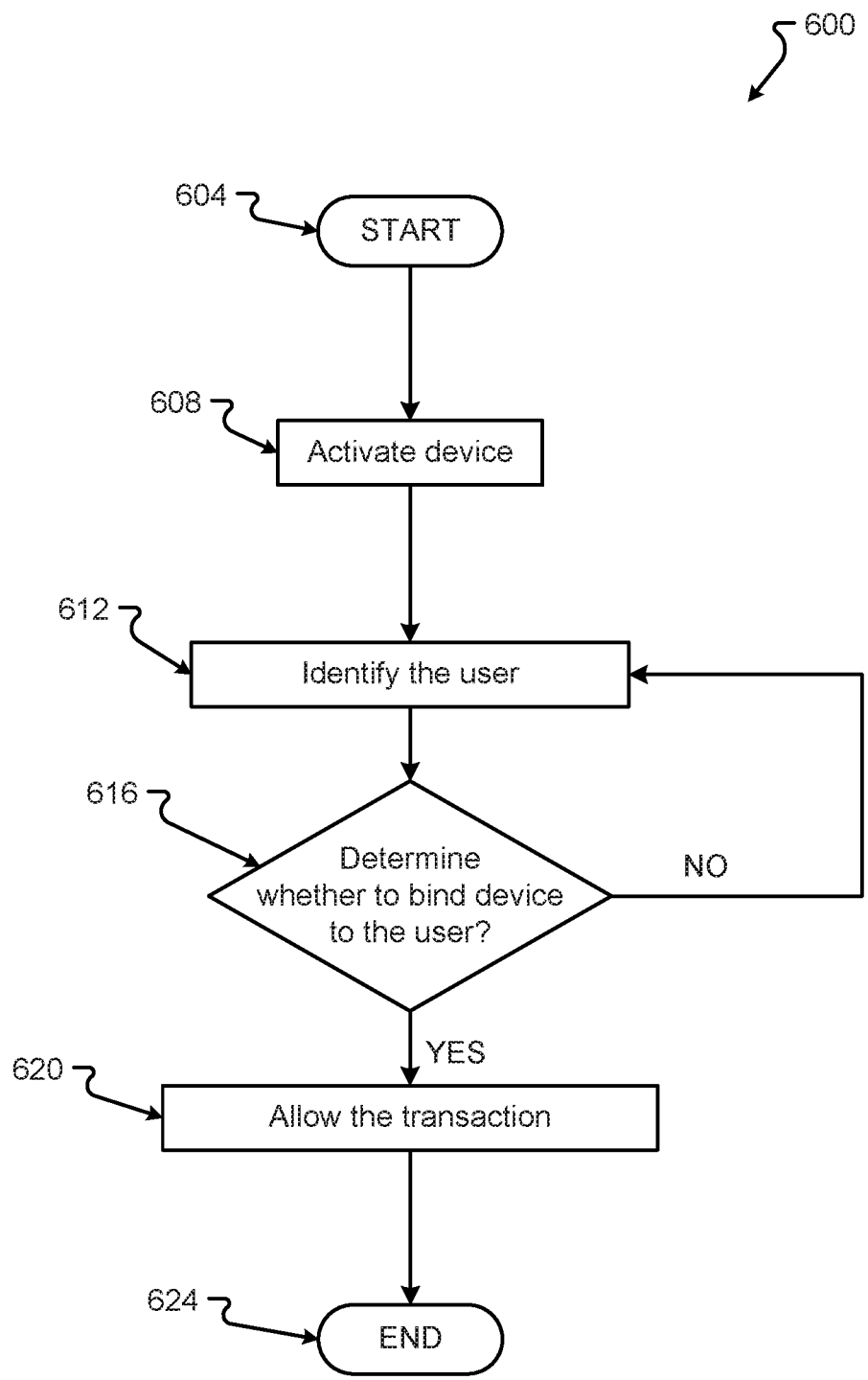
FIG. 6 is a flow diagram of an embodiment of a method generally directed to binding a user to a device.

An embodiment of a method 600 for binding a user 120 with a device 104 may be as described in conjunction with FIG. 6.

In step 608, the device 104 becomes active. Activation of the device 104 may include the powering on or waking of the device 104, and the user 120 beginning to use the device 104.

Upon activation and response thereto, the device 104 may then identify the user 120, in step 612. The identification of the user 120 can be through the exchange of a login, password, fingerprint, or other biometric data. The ID of the user 120 may then be provided to the user ID component 212. The user ID component 212 may compare that user ID information with user information in data store 228. If the comparison is correct, the method 600 may proceed to step 616. In step 616, the binding component 316 may determine whether to create an act of binding with the user 120. An act of binding is a determination that the correct user 120 is using the device 104, and that they use it active on the device 104. This binding ensures that there is no spoofing with a different user, who may have a first-person enter information and then use the device 104 thereinafter. Thus, the binding persists while the user 120 is using a device 104.

If a binding is determined not to be used, the process 600 proceeds NO back to identifying the user 612. If a binding is determined to be active, the method 600 proceeds YES to step 620. It should be noted that the binding is, as it is persistent, must be checked periodically. As such, the user may be identified through more biometric information, or through other information, such as, heuristics of how the user is using the device 104. At any time, the binding component 216 can cancel the binding. However, while the binding is active, the device 104, computer 108, or node 116 may allow any type of transaction or execution of an event in step 620.

Figure 7:
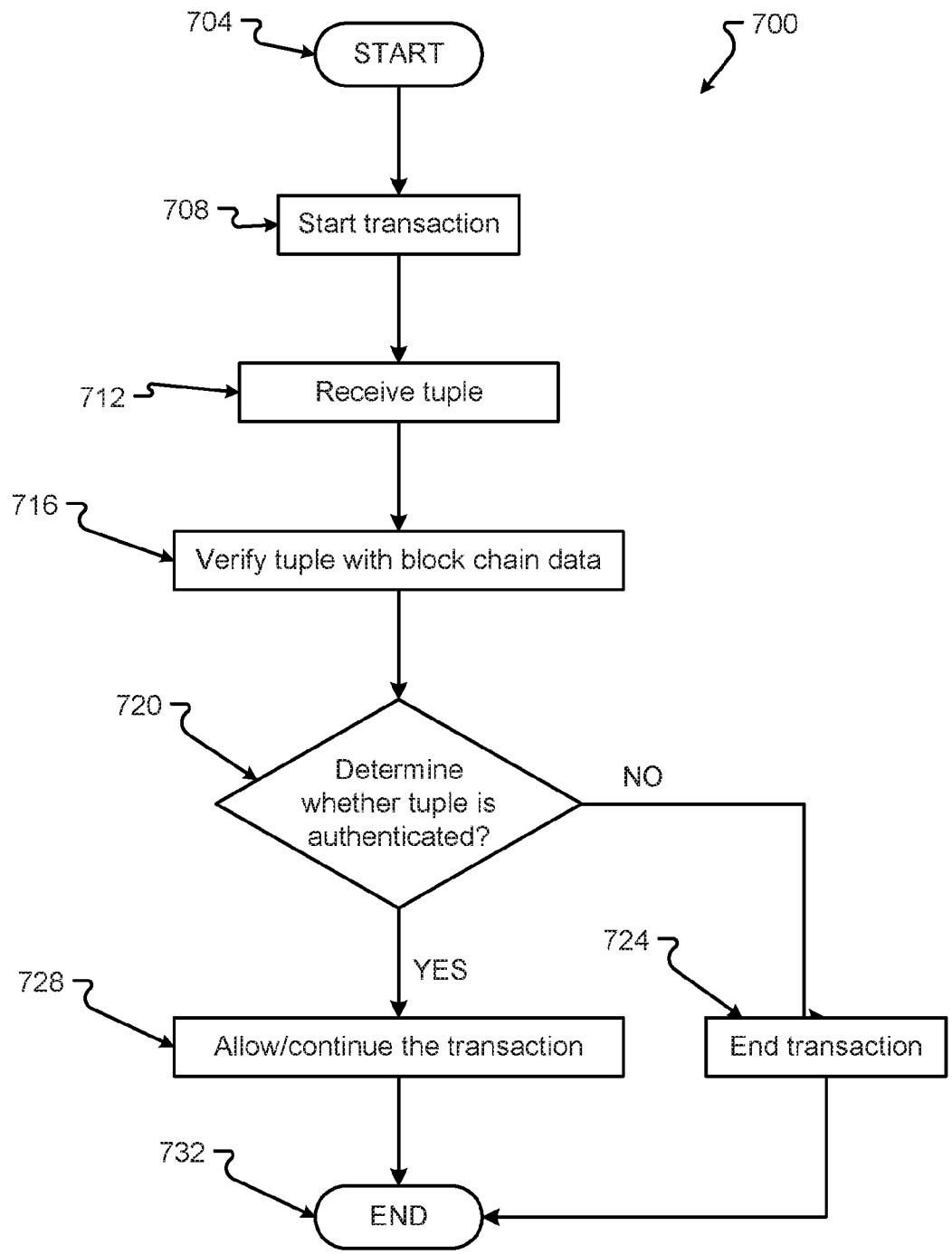
FIG. 7 is a flow diagram of an embodiment of a method generally directed to securing an interaction with a tuple.

An embodiment of a method for conducting a secured transaction by verifying information in a blockchain may be as shown in FIG. 7.

The device 104 and one or more other parties may begin a transaction or interaction, in step 708. The interaction can be any type of communication or event that requires secure communication and knowledge of the parties involved. For example, the secured interaction can be a financial transaction between the user 120 and a bank, between the user 120 and the government, such as, a tax process, or other type of transaction.

In step 712, a node or a third-party receives a tuple 426. The tuple 426 may be formed at the device 104. The tuple 426 can be generated by a tuple-generator 220, from information from one or more blockchains 404 or sidechains 420 stored in the data store 224. The tuple 426 can have a predetermined or user-selected format, such as described in conjunction with FIG. 4C. The tuple generator 220 may only function to generate the tuple 426 if the binding component 216 determines that a binding is present between the user 120 and device 104, as described in conjunction with FIG. 6. The tuple 426 can be sent from the device 104 or the communication interface 204 to the computer 108, or directly through a network 112 to a node 116. Further, the tuple 426 may be sent to a third-party through the network 112, but then sends the tuple to a node 116. Still, in other embodiments, the device 104 can provide the tuple 426 to the computer 108, which then uses that tuple in communication with a third-party to verify the tuple 426, either by that party's own efforts or through a node 116.

The node 116 or the third-party can verify the tuple 426 with a blockchain 404 and/or in sidechain 420, in step 716. Here, the tuple 426 may be extracted and the information in the tuple 426 may be compared to the blockchain 404 or sidechain 420 stored in data store 316. The tuple generator/authenticator 304 can use the predetermined structure of the tuples 426 described in conjunction with FIG. 4C or information presented in the tuple 426 to determine what parts of the blockchain 404 are used to form the tuple 426. These portions are compared to the blockchain 404 and/or sidechain 420 and determined if the entries are the same. The tuple generator/authenticator 304 then determines if the tuple 426 is authenticated in step 720. If the tuple 426 components and the blockchain 404 and/or sidechain 420 components are the same, then the process proceeds YES to step 728. However, if the tuple 426 is not authenticated, the process 700 proceeds NO to end the transaction in step 724. As such, the tuple 426 can be used to prevent unauthorized transactions. In step 728, the transaction is continued as the user 120 or the device 104 are authenticated and determined to be the correct person and device 104 used for the transaction.

It should be noted that the tuple 426 can be generated from blockchains 404 and/or sidechains 420, both having information about the device 104 and/or computer 108, but also about the user 120. Further, the tuple 426 can include sidechain information about a previous transaction. As such, the tuple 426 can provide a condensed form of rich information from the various blockchains 404 and/or sidechains 420, regardless of the content of the blockchain 404 and/or sidechain 420, in a way that makes the duplication or fraudulent creation of the tuple 426 hard or impossible. Due to the richness of the blockchain 404 and sidechain 420 information, the tuple 426 can draw from various different sources and provide a great amount of information to the node 116 for verification. Further, it is possible, if a node 116 is unsure of the tuple 426, the node 116a may inquire from other nodes 116b and/or 116c for information about the blockchain 404 and/or sidechain 420. As such, the nodes 116 may vote on the authenticity of the tuple 426.

FIG. 8 illustrates a block diagram of a computing environment 800 that may function as the servers, user computers, devices, mobile devices, or other systems provided and described above. The environment 800 includes one or more user computers 805, 810, and 815. The user computers 805, 810, and 815 may be general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These user computers 805, 810, 815 may also have any of a variety of applications, including for example, database client and/or server applications, and web browser applications. Alternatively, the user computers 805, 810, and 815 may be any other electronic device, such as a thin-client computer, Internet-enabled mobile telephone, and/or personal digital assistant, capable of communicating via a network 820 and/or displaying and navigating web pages or other types of electronic documents. Although the exemplary computer environment 800 is shown with three user computers, any number of user computers may be supported.

Environment 800 further includes a network 820. The network 820 may can be any type of network familiar to those skilled in the art that can support data communications using any of a variety of commercially-available protocols, including without limitation SIP, TCP/IP, SNA, IPX, AppleTalk, and the like. Merely by way of example, the network 820 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more server 825, 830. In this example, server 825 is shown as a web server and server 830 is shown as an application server. The web server 825, which may be used to process requests for web pages or other electronic documents from user computers 805, 810, and 815. The web server 825 can be running an operating system including any of those discussed above, as well as any commercially-available server operating systems. The web server 825 can also run a variety of server applications, including SIP servers, HTTP servers, FTP servers, CGI servers, database servers, Java servers, and the like. In some instances, the web server 825 may publish operations available operations as one or more web services.

The environment 800 may also include one or more file and or/application servers 830, which can, in addition to an operating system, include one or more applications accessible by a client running on one or more of the user computers 805, 810, 815. The server(s) 810 and/or 825 may be one or more general purpose computers capable of executing programs or scripts in response to the user computers 805, 810, 815. As one example, the server 830, 825 may execute one or more web applications. The web application may be implemented as one or more scripts or programs written in any programming language, such as Java™, C, C#®, or C++, and/or any scripting language, such as Perl, Python, or TCL, as well as combinations of any programming/scripting languages. The application server(s) 830 may also include database servers, including without limitation those commercially available from Oracle, Microsoft, Sybase™, IBM™ and the like, which can process requests from database clients running on a user computer 805.

The web pages created by the server 825 and/or 830 may be forwarded to a user computer 805 via a web (file) server 825, 830. Similarly, the web server 825 may be able to receive web page requests, web services invocations, and/or input data from a user computer 805 and can forward the web page requests and/or input data to the web (application) server 830. In further embodiments, the web server 830 may function as a file server. Although for ease of description, FIG. 8 illustrates a separate web server 825 and file/application server 830, those skilled in the art will recognize that the functions described with respect to servers 825, 830 may be performed by a single server and/or a plurality of specialized servers, depending on implementation-specific needs and parameters. The computer systems 805, 810, and 815, web (file) server 825 and/or web (application) server 830 may function as the system, devices, or components described in FIGS. 1-3.

The environment 800 may also include a database 835. The database 835 may reside in a variety of locations. By way of example, database 835 may reside on a storage medium local to (and/or resident in) one or more of the computers 805, 810, 815, 825, 830. Alternatively, it may be remote from any or all of the computers 805, 810, 815, 825, 830, and in communication (e.g., via the network 820) with one or more of these. The database 835 may reside in a storage-area network ("SAN") familiar to those skilled in the art. Similarly, any necessary files for performing the functions attributed to the computers 805, 810, 815, 825, 830 may be stored locally on the respective computer and/or remotely, as appropriate. The database 835 may be a relational database, such as Oracle 20i®, that is adapted to store, update, and retrieve data in response to SQL-formatted commands.

FIG. 9 illustrates one embodiment of a computer system 900 upon which the servers, user computers, devices, mobile devices, or other systems or components described above may be deployed or executed. The computer system 900 is shown comprising hardware elements that may be electrically coupled via a bus 955. The hardware elements may include one or more central processing units (CPUs) 915; one or more input devices 910 (e.g., a mouse, a keyboard, etc.); and one or more output devices 915 (e.g., a display device, a printer, etc.). The computer system 900 may also include one or more storage devices 920. By way of example, storage device(s) 920 may be disk drives, optical storage devices, solid-state storage devices such as a random access memory ("RAM") and/or a read-only memory ("ROM"), which can be programmable, flash-updateable and/or the like.

The computer system 900 may additionally include a computer-readable storage media reader 925; a communications system 930 (e.g., a modem, a network card (wireless or wired), an infra-red communication device, etc.); and working memory 940, which may include RAM and ROM devices as described above. The computer system 900 may also include a processing acceleration unit 935, which can include a DSP, a special-purpose processor, and/or the like.

The computer-readable storage media reader 925 can further be connected to a computer-readable storage medium, together (and, optionally, in combination with storage device(s) 920) comprehensively representing remote, local, fixed, and/or removable storage devices plus storage media for temporarily and/or more permanently containing computer-readable information. The communications system 930 may permit data to be exchanged with a network and/or any other computer described above with respect to the computer environment 800. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 900 may also comprise software elements, shown as being currently located within a working memory 940, including an operating system 945 and/or other code 950. It should be appreciated that alternate embodiments of a computer system 900 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 905 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

The exemplary systems and methods of this disclosure have been described in relation to conducting secure interactions between devices. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others. The present disclosure can provide a number of advantages depending on the particular configuration. For example, the system allows for the identification of a user and their device by providing information from a large data set—the blockchain. The blockchain is unique to the user and/or device and cannot be recreated or duplicated. Thus, using the blockchain ensures correct identification of the device and user and functions better to secure interactions or transaction performed on the device. These and other advantages will be apparent from the disclosure contained herein.

In an example, when the person navigates, on their computer, to s bank's website for the purpose of initiating a transaction, the user and/or the bank can provide one-time tokens as described herein. The one-time tokens replace authentication where a user provides a username and password or username and authentication application provided token. The Web Service of the bank can pass a one-time-use token (a number or string or QR code or photo or certificate) that can be entered into the smartphone (device 104) manually, or electronically from the computer. The provision of the one-time token can start the process of authenticating the web page to the actual provider (the bank). This provision of a token can then direct the cellular service provider to provide to the bank a different one-time-use token, associated with the user, that can use the second one-time token to authenticate the user to the device securing the identity of the transaction. In this way, no passwords or usernames or authentication-application-tokens are needed to be entered into the web interface to identify and secure the interaction being attempted.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 202(f) and/or Section 202, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for authenticating a service, the method comprising:
    activating a device;
    in response to activating the device, generating a blockchain;
    the device executing a first event;
    in response to activating the device and executing the first event, storing a first block in the blockchain, wherein the first block describes the first event associated with activating the device;
    the device executing a second event;
    storing a second block associated with the second event occurring with the device;
    the device executing a third event;
    storing a third block associated with the third event occurring with the device, wherein the first, second, and third blocks in the blockchain are associated with events that occur only on the device, wherein the blockchain is an abstract composite of information unique to the device;
    the device identifying a user using the device;
    the device establishing a binding is active and associated with the user;
    establishing an interaction with a second computer system;
    the device sending an indication of the binding to the second computer system; and
    with the binding active, providing at least a portion of the blockchain during the interaction to secure the interaction, wherein the portion of the blockchain uniquely identifies the device to the second computer system.

2. The method according to claim 1, wherein the portion of the blockchain is a tuple.

3. The method according to claim 2, wherein each block includes an identifier, data, and a timestamp.

4. The method according to claim 3, wherein the second and third event occur after the first event.

5. The method according to claim 4, wherein the second block includes a reference to the first block.

6. The method according to claim 5, wherein the blockchain is periodically updated.

7. The method according to claim 5, wherein the activating of the device is a first activation of the device.

8. The method according to claim 1, wherein, when the user is no longer using the device, the device deactivates the binding with the user that was using the device.

9. The method according to claim 8, wherein the portion of the blockchain is provided to the second computer system only if the binding is active.

10. The method according to claim 1, wherein the second computer system:
   storing the blockchain;
   verifying the portion of the blockchain provided by the device with the stored blockchain;
   generating a second blockchain; and
   providing at least a second portion of the second blockchain during the interaction to secure the interaction, wherein the second portion of the second blockchain uniquely identifies the second computer system to the device.

11. A device in communication with a second computer system, the device comprising:
   a memory;
   a processor in communication with the memory, the processor adapted to:
      identify a user using the device;
      establish that a binding is active while the user is using the device;
      establish an interaction with the second computer system;
      send an indication of the binding to the second computer system;
      while the binding is active, send a tuple, formed from at least a portion of a blockchain, to the second computer system, wherein the at least a portion of the blockchain uniquely identifies the device to the second computer system, wherein all blocks in the blockchain are associated with events that occur only on the device and created from events occurring with the device, wherein the second computer system verifies that the tuple is associated with the blockchain, wherein the interaction is secured when the tuple is verified; and
      conducting the secure interaction.

12. The system of claim 11, wherein the secure interaction continues while the binding is active.

13. The system of claim 11, wherein the binding is discontinued, and wherein the processor sends a second indication to the second computer system that the binding is inactive.

14. The system according to claim 13, wherein the secure interaction is stopped based on the second indication.

15. The system according to claim 11, wherein the processor provides an instance of the blockchain to a third party computer system, wherein the second computer system provides the tuple to the third party computer system to verify the tuple.

16. A non-transitory computer readable medium having stored thereon instructions that cause a processor to execute a method, the method comprising:
   communicating with a device;
   receiving an indication of a binding between the device and a user is active;
   while the binding is active, receiving a tuple formed from at least a first portion of a blockchain and at least a second portion of a sidechain, wherein the at least a first and at least a second portions uniquely identify the device wherein all blocks in the blockchain are associated with events that occur only on the device;
   verifying that the tuple is associated with the blockchain and the sidechain, wherein the interaction is secured when the tuple is verified; and
   conducting the secure interaction.

17. The computer readable medium of claim 16, wherein the sidechain describes events associated with previous interactions with the user.

18. The computer readable medium of claim 16, the method further comprising:
   receiving the blockchain;
   generating the sidechain; and
   providing the blockchain and the sidechain to a third party computer system.

19. The computer readable medium according to claim 18, the method further comprising: providing the tuple to the third party computer system to verify the tuple.

20. The computer readable medium according to claim 19, wherein the binding is discontinued, and wherein the method further comprising:
   receiving a second indication that the binding is inactive; and
   stopping the secure interaction based on the second indication.

* * * * *